July 25, 1933.          L. LASSEN ET AL          1,919,593
CHAIN PIPE WRENCH
Filed April 25, 1930
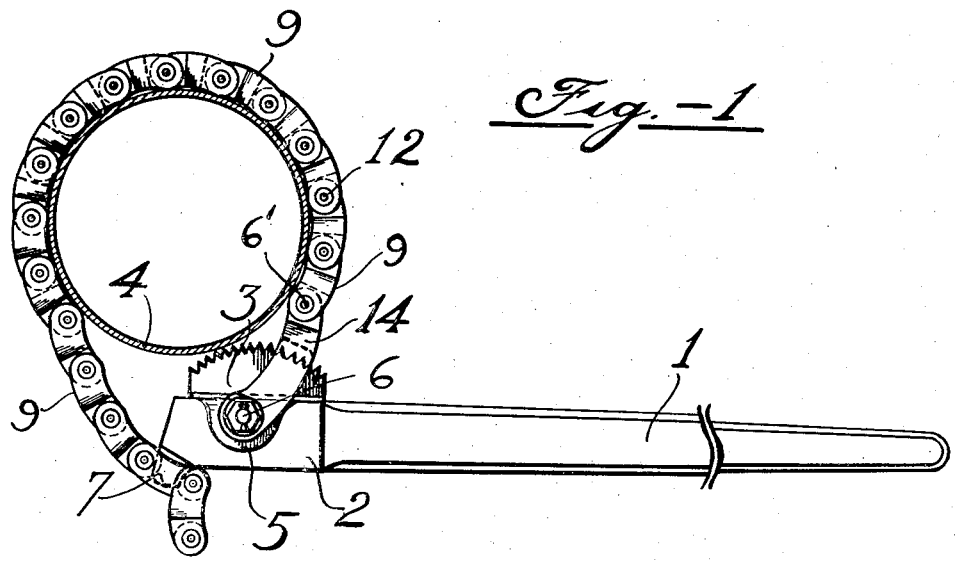
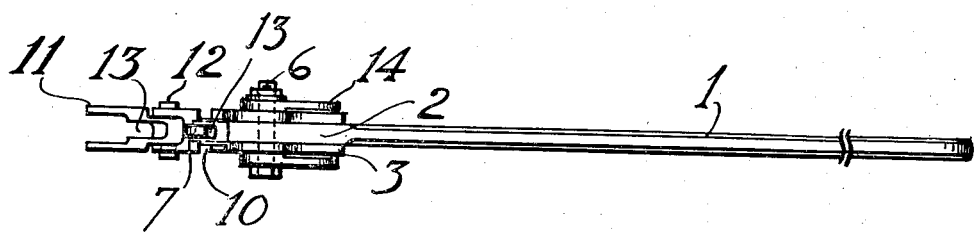
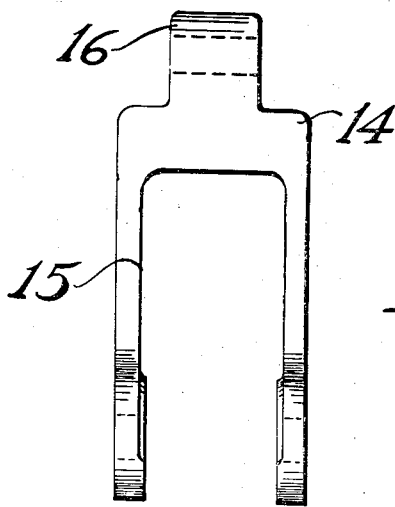
Inventors
Louis Lassen
William Boehm
By
W. E. Currie  Attorney Patented July 25, 1933

1,919,593

UNITED STATES PATENT OFFICE

LOUIS LASSEN, OF ELIZABETH, AND WILLIAM BOEHM, OF ROSELLE PARK, NEW JERSEY, ASSIGNORS TO STANDARD OIL DEVELOPMENT COMPANY, A CORPORATION OF DELAWARE

CHAIN PIPE WRENCH

Application filed April 25, 1930. Serial No. 447,146.

This invention relates to improvements in chain pipe wrenches. The invention will be fully understood from the following description taken in connection with the accompanying drawing, in which latter Fig. 1 is a side elevation of a pipe wrench;

Fig. 2 is a bottom plan view of the pipe wrench with some of the chain links broken away and showing the construction of the links; and Fig. 3 is a plan view of the link connecting the chain to the handle.

In the drawing, reference numeral 1 designates a wrench handle having a head 2. A toothed segment 3 is disposed upon the back of the head. The teeth of the segment face outwardly from the head and are disposed in the form of an arc so as to maintain a biting grip upon a pipe 4, or other article to be turned, in all operative positions of the wrench. The toothed segment is provided with spaced, outwardly extending perforated ears 5 which are adapted to embrace the sides of the head 2. A bolt 6 extends through the head and through the perforated ears, securing the toothed segment in position. The front face of the head is provided at its outer end with an upstanding tooth, or lug 7 which is formed integral with the head.

A flexible chain is attached to the head by means of the bolt 6 and is adapted to surround the pipe 4, or other article to be engaged, and the free end of the chain is secured to the tooth 7. The chain comprises a plurality of solid metal links 9, each formed of a single piece of metal such as cast steel. One end of each link is reduced at opposite sides as indicated at 10. The opposite end of the link is bifurcated as indicated at 11 forming an opening sufficiently large to receive the reduced end of the adjoining link. The reduced and bifurcated ends of the link are each perforated to receive a pivot pin 12. The base of the bifurcated portion of the link is provided with a slot indicated at 13 of sufficient size to receive the tooth 7 of the handle. The slot 13 extends from the base of the bifurcated portion into the reduced end. A link 14 connects the chain to the head of the handle. The link 14 is elongated and the bifurcated portion 15 is sufficiently long to freely receive the toothed segment. The end of the link 16 which is reduced at opposite sides, is formed of a size to fit pivotally in the birfurcated portion of the adjoining link 9. The link 14 is secured pivotally to the head by means of the bolt 6. The rear face of tooth 7 is curved concavely to form a hook which is adapted to engage against the base of slot 13.

The wrench described is strong and can be utilized for heavy work without stretching the chain.

Various changes may be made within the scope of the appended claims, in which it is desired to claim all novelty inherent in the invention as broadly as the prior art permits.

We claim:

1. A pipe wrench comprising a handle having a head, a chain attached to the head, the chain having solid metal links formed of a single piece, one end of each link being solid and reduced at opposite sides and the opposite end bifurcated and embracing and pivoted to the reduced end of the adjoining link, a portion only of the base of the bifurcated portion being provided with a slot, the portion of the slot facing the reduced end of the link being closed and a tooth associated with the head adapted to engage the base of the slot.

2. A pipe wrench comprising a handle having a head, a chain attached to the head, the chain having links formed of a single piece, one end of each link being reduced at opposite sides forming shoulders facing the end, the opposite end being bifurcated and embracing and pivoted to the reduced end of the adjoining link, each link having a slot extending from a portion only of the base of the bifurcated portion into the reduced end, the portions of the slot facing the reduced end of the link being closed, and a tooth associated with the head adapted to engage the base of the slot.

LOUIS LASSEN.
WILLIAM BOEHM.